(12) United States Patent
Gruenwedel et al.

(10) Patent No.: US 12,351,187 B2
(45) Date of Patent: Jul. 8, 2025

(54) COMPUTER-IMPLEMENTED METHOD FOR ESTIMATING A VEHICLE POSITION

(71) Applicant: Bayerische Motoren Werke Aktiengesellschaft, Munich (DE)

(72) Inventors: Sebastian Gruenwedel, Ulm (DE); Manus McElhone, Ulm (DE); Marc Scott Meissner, Munich (DE); Pascal Minnerup, Unterschleissheim (DE); Peter Pedron, Augsburg (DE); Sebastian Rauch, Eisenhofen (DE); Barbara Roessle, Boerslingen (DE); Maxi Winter, Munich (DE); Martin Zeman, Vestec (CZ)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 18/266,846

(22) PCT Filed: Dec. 6, 2021

(86) PCT No.: PCT/EP2021/084427
§ 371 (c)(1),
(2) Date: Jun. 13, 2023

(87) PCT Pub. No.: WO2022/128577
PCT Pub. Date: Jun. 23, 2022

(65) Prior Publication Data
US 2024/0043016 A1 Feb. 8, 2024

(30) Foreign Application Priority Data
Dec. 14, 2020 (DE) ...................... 10 2020 133 330.7

(51) Int. Cl.
*B60W 40/10* (2012.01)

(52) U.S. Cl.
CPC ....... *B60W 40/10* (2013.01); *B60W 2420/408* (2024.01); *B60W 2554/4041* (2020.02)

(58) Field of Classification Search
CPC ........... B60W 40/10; B60W 2420/408; B60W 2554/4041; G01S 13/86; G01S 13/865;
(Continued)

(56) References Cited

U.S. PATENT DOCUMENTS 8,880,001 B1 11/2014 Hwang et al.
10,315,649 B2 * 6/2019 Kadetotad ......... B60W 30/0956
(Continued)

FOREIGN PATENT DOCUMENTS

AU 2024266861 A1 * 12/2024 ............ B60T 13/665
CN 112066982 A 12/2020
(Continued)

OTHER PUBLICATIONS

International Search Report (PCT/ISA/210) issued in PCT Application No. PCT/EP2021/084427 dated Mar. 25, 2022 with English translation (4 pages).
(Continued)

*Primary Examiner* — Atul Trivedi
(74) *Attorney, Agent, or Firm* — Crowell & Moring LLP (57) ABSTRACT

A computer-implemented method estimates a vehicle position. The method provides a first position estimate based on position information from at least one first source, wherein the first position estimate is assigned a first bias value and a first statistical variance; provides a second position estimate based on position information from at least one second source; determines a third bias value and a third statistical variance, wherein the third bias value and the third statistical variance are assigned to a third position estimate which results from a combination of the first position estimate and the second position estimate; and evaluates the first position
(Continued)

estimate and the third position estimate on the basis of a quality criterion which takes into account the bias value assigned to each position estimate and the statistical variance assigned to each position estimate. When, according to the quality criterion, the third position estimate is better than the first position estimate, the third position estimate is used as the result of the estimation of the vehicle position or as the basis for a combination with position information from one or more additional sources. When, according to the quality criterion, the first position estimate is better than the third position estimate, the first position estimate is used as the result of the estimation of the vehicle position or as the basis for a combination with position information from one or more additional sources.

9 Claims, 2 Drawing Sheets

(58) Field of Classification Search
CPC ...... G01S 13/867; G01S 13/931; G01S 17/86; G01S 17/931; G01S 2013/9316; G01S 2013/932; G01S 2013/9322; G01S 2013/9323
USPC .......................................................... 701/1
See application file for complete search history.

(56) References Cited

U.S. PATENT DOCUMENTS

| | | | | |
|---|---|---|---|---|
| 10,404,261 | B1* | 9/2019 | Josefsberg | G01S 13/931 |
| 12,174,641 | B2* | 12/2024 | Moawad | G05D 1/0257 |
| 12,175,348 | B2* | 12/2024 | Lee | G06N 3/084 |
| 12,175,397 | B2* | 12/2024 | Mubarek | G06Q 50/40 |
| 2010/0305857 | A1* | 12/2010 | Byrne | G06T 7/73 |
| | | | | 382/107 |
| 2018/0045832 | A1 | 2/2018 | Ibrahim et al. | |
| 2018/0170354 | A1* | 6/2018 | Lee | B60R 11/04 |
| 2018/0232947 | A1* | 8/2018 | Nehmadi | G01S 7/295 |
| 2018/0349746 | A1* | 12/2018 | Vallespi-Gonzalez | |
| | | | | G01S 7/4808 |
| 2019/0258878 | A1* | 8/2019 | Koivisto | G06V 10/46 |
| 2019/0265041 | A1 | 8/2019 | Merfels et al. | |
| 2019/0383945 | A1* | 12/2019 | Wang | G01S 7/4861 |
| 2020/0158862 | A1* | 5/2020 | Mahmoud | G01S 13/931 |
| 2020/0370920 | A1 | 11/2020 | Ahmed et al. | |
| 2020/0386555 | A1* | 12/2020 | Schroeter | G01S 17/931 |
| 2024/0393783 | A1* | 11/2024 | Brassard | G05D 1/0088 |
| 2024/0400064 | A1* | 12/2024 | Hayashi | B60W 50/0097 |
| 2024/0416829 | A1* | 12/2024 | Faruque | B60Q 1/525 |
| 2024/0418531 | A1* | 12/2024 | Okuma | G01C 21/3833 |
| 2024/0418868 | A1* | 12/2024 | Ratnaraj | G01S 19/25 |
| 2024/0422502 | A1* | 12/2024 | Heide | H04S 7/40 |
| 2024/0425086 | A1* | 12/2024 | Kim | B60W 60/005 |
| 2025/0074407 | A1* | 3/2025 | Isele | G01C 21/30 |
| 2025/0089016 | A1* | 3/2025 | Belzberg | H04W 64/006 |

FOREIGN PATENT DOCUMENTS

| | | | | |
|---|---|---|---|---|
| DE | 690 34 047 | T2 | 3/2004 | |
| DE | 102011119762 | A1* | 6/2012 | ........... G01C 21/165 |
| DE | 102017002637 | A1* | 10/2017 | |
| DE | 10 2016 222 272 | A1 | 5/2018 | |
| DE | 102020118628 | A1* | 1/2022 | |
| DE | 102022109939 | A1* | 12/2022 | ........ B60W 50/0097 |
| EP | 4211422 | B1* | 12/2024 | ........ G01C 21/1656 |
| WO | WO-2016182964 | A1* | 11/2016 | ............. G01C 21/00 |
| WO | WO-2019018315 | A1* | 1/2019 | ........... G01C 21/165 |
| WO | WO-2020109471 | A1* | 6/2020 | ............ B61L 25/021 |
| WO | WO-2020109476 | A1* | 6/2020 | ............ B61L 25/023 |

OTHER PUBLICATIONS

German-language Written Opinion (PCT/ISA/237) issued in PCT Application No. PCT/EP2021/084427 dated Mar. 25, 2022 (13 pages).

German-language Search Report issued in German Application No. 10 2020 133 330.7 dated Jul. 7, 2021 with partial English translation (10 pages).

* cited by examiner

COMPUTER-IMPLEMENTED METHOD FOR ESTIMATING A VEHICLE POSITION

BACKGROUND AND SUMMARY

The invention relates to a computer-implemented method for estimating a position of a vehicle. Furthermore, the invention relates to a processing device and a computer program for carrying out such a method, as well as a computer-readable (storage) medium containing instructions for carrying out such a method.

A vehicle may have an advanced driver assistance system (ADAS) that is set up to influence longitudinal and/or lateral guidance of the vehicle. For example, a lane assistant may be set up to keep the vehicle between lane markings. The markings can for example be scanned by means of a camera and automatically detected.

Many ADAS require knowledge of the exact position of the vehicle. The position can be determined in the longitudinal and/or lateral direction and expressed relative to a predetermined reference point. An absolute geographic position can be determined, for example, from map information relating to a predetermined geodetic reference system such as the WGS84. For example, a relative position of the vehicle can be specified in the lateral direction relative to a detected lane marking.

Determining the position of the vehicle is generally subject to a number of errors and inaccuracies. Sensors, for example, provide noisy and/or falsified information or may occasionally fail altogether. Different measurement conditions or complex processing heuristics lead to determinations of different accuracy or reliability.

In order to enable the most accurate and reliable determination of the position of the vehicle, several, preferably statistically independent sources of position information may be used for a statistical estimation of the vehicle position. The various position information items can be based, for example, on a camera-based detection of lane boundaries, on a LiDAR-based detection of objects or obstacles, on DGPS data, and/or on an odometry-based prediction. The multiple position information items from the different sources can then be combined to form an estimated vehicle position. Here, common algorithms of sensor data fusion, which are known to the person skilled in the art, such as Kalman filter techniques, can be used.

For example, some traditional methods of sensor data fusion provide multiple position estimates based on different sources, each of which has an associated statistical variance in the form of a covariance. The covariance, assuming Gaussian white noise, reflects an accuracy of the respective position estimate. From a combination of the multiple position estimates, for example by means of Kalman filtering, one usually obtains a new position estimate with a covariance that is lower than the covariances of the individual position estimates from the different sources.

A challenge associated with known methods for estimating a vehicle position of the type mentioned above is that in reality the individual position estimates from the different sources often do not exactly follow a normal statistical distribution around the true position of the vehicle. A respective mean value of a statistical distribution (possibly differing from a normal distribution), which results from a single position estimate, is often offset by a certain distance from the true position of the vehicle. This offset or distance is usually also referred to as a bias. In the context of this specification, the term bias value is also used for this purpose. In simple cases, for example, the bias value can be a constant offset in a certain direction. However, it is also possible that the bias value varies according to size and direction.

If some or all of the position estimates based on the different sources have a bias, conventional (especially Kalman filter-based) algorithms of sensor data fusion usually do not lead to an optimal estimate of the vehicle position. If, for example, a first position estimate without a bias and a second position estimate with a bias are combined, the result, i.e. the combined position estimate, also has a bias and is therefore often even worse than the first position estimate.

Graph-based localization algorithms (so-called graph SLAM algorithms) are known from robotics, which address the problem of biased position data by modeling the bias as part of the position estimation. However, the available information is generally not sufficient for applications in the field of autonomous driving to be able to correctly estimate the bias. In addition, such graph-based approaches have the disadvantage that they require a lot of computing time and are therefore not always suitable, especially for applications in the field of autonomous driving.

One of the objects underlying the invention is to provide improved position determination for a vehicle. The invention achieves the object by means of the subject-matter of the independent claims. Dependent claims reflect preferred embodiments.

It should be noted that additional features of a claim dependent on an independent claim, without the features of the independent claim or only in combination with a subset of the features of the independent claim, may form a separate invention which is also independent of the combination of all the features of the independent patent claim, which can be made the subject of an independent claim, a division application or a subsequent application. This applies in the same way to technical teachings described in the description, which may form an invention independent of the features of the independent patent claims.

A first aspect of the present invention relates to a computer-implemented method for estimating a vehicle position. The method can be carried out, for example, by means of a (data) processing device (see also below for the second aspect of the invention).

One step of the method is to provide a first position estimate based on one or more position information items from at least one first source, wherein a first bias value and a first statistical variance are assigned to the first position estimate.

The first position estimate can for example be assigned a statistical distribution, such as a normal distribution. In particular, the first position estimate may be given in the form of such a statistical distribution.

In this case, the statistical variance may be given in relation to the statistical distribution, for example in the form of a covariance, a standard deviation, three times the standard deviation or similar.

The bias value can be specified for example as a maximum expected deviation (in the sense of a worst-case deviation). If the bias value is correct, an actual bias (i.e. a deviation that actually occurs in an individual case) is therefore between 0 and the specified bias value in this case.

Alternatively, the bias value can also be specified in the form of a (further) statistical variance, for example in the form of a covariance, a standard deviation or three times a standard deviation of a normal distribution.

For example, in this case, an associated model of reality can randomize the bias once for a series of measurement data and then the current error for each measurement point. The total error would then be the sum of the bias and the current error.

The bias value can for example be constant or assumed to be constant at least for a certain period of time.

Another step is to provide a second position estimate based on one or more position information items from at least one second source. A second bias value and a second statistical variance can be assigned to the second position estimate.

The sources may include, for example, one or more elements from the following list: An (environment) sensor, in particular in the form of a LiDAR sensor, a RADAR sensor and/or a camera; an odometer; a receiver module of a satellite navigation system. The aforementioned sensors or the odometer and/or the receiver module are preferably located in or on the vehicle whose position is to be estimated. In the case of the odometer, a position estimate can be provided, for example in the form of a prediction based on odometry data. The odometry data can, for example, express a completed movement of the vehicle relative to a previously occupied point and can be determined, for example, on the basis of signals provided by rotation rate sensors on the wheels of the vehicle.

For example, one or more of the sources can provide information about a (for example, optically) detected lane boundary, a (for example, optically or by LiDAR) detected orientation point (also known as a landmark), or an object or obstacle (for example, detected optically or by LiDAR) as the basis for a position estimate. In other words, for example, a lane boundary and/or a landmark and/or an object in the vehicle surroundings can be detected in an image provided by the camera and/or the LiDAR sensor.

In particular, a position estimation can be carried out relative to one or more lane boundaries and for example can give an indication of which of several lanes the vehicle is driving on. For example, in order to be able to guarantee sufficient safety in autonomous or highly automated driving, it is necessary that the vehicle position is reliably determined relative to the surrounding lanes. Within the framework of an overall safety concept, it is desirable to determine with a very high statistical reliability at which position within a lane the vehicle is located. In particular, positioning within the lane that is as stable as possible is desirable.

As mentioned above, a source may also be provided in the form of a receiver module, which provides position information based on received signals from a satellite-based navigation system. The estimation of the vehicle position can therefore be done using the tools of a satellite navigation system (for example GPS or DGPS).

In general, the estimation of the vehicle position can be done, for example, in relation to or using map information, i.e. it can be estimated, for example, at which map position the vehicle is located. For example, the map information can be provided by a map memory. The map data may include, in particular, a position or orientation of an object, a landmark and/or a road on which the vehicle can travel.

The map data can for example be based, at least in part, on sensor-detected data recorded during one or more reconnaissance trips of a reconnaissance vehicle. An environment sensor system used for this purpose may include, for example, a receiver of a global satellite navigation system (for example GPS or DGPS), one or more optical cameras, one or more RADAR sensors and/or one or more LiDAR sensors. Accordingly, a digital map stored in the map memory may contain several layers, for example one layer is based on data of a global satellite navigation system, another layer is based on optical camera data, and another layer is based on LiDAR data. The different layers can contain features that can be detected by means of the respective sensor system.

Providing the first or second position estimate may also consist, for example, of receiving the first position estimate by a processing unit executing the method or by a (software) function module implemented in the processing unit, wherein the position estimate is ready for further processing after receiving it. For example, the first position estimate from another processing unit, which may be part of a sensor module, for example, or from another functional module, is output by the processing unit performing the method to the processing device or to the first-mentioned functional module for further processing.

The first position estimate may already be a combined position estimate based on fused position information from several different first sources. For example, the first position estimate may be an intermediate result or a preliminary result of a multi-stage combination of position estimates, each of which is based on position information from different sources. Alternatively, the first position estimate may be based on position information from a single first source.

The second position estimate can preferably be based on position information from a single second source. Alternatively, the second position estimate may already be a combined position estimate, as described above with reference to the first position estimate.

A further step of the method is the determination of a third bias value as well as a third statistical variance, wherein the third bias value and the third statistical variance are assigned to a third position estimate, which results from a combination of the first position estimate and the second position estimate.

For example, the third position estimation may be the result of a statistical combination, such as averaging or multiplication (followed by normalization) of two probability distributions, those of the first and second position estimates. Preferably, the third position estimate is the result of a combination of the first position estimate and the second position estimate using a Kalman filter. Accordingly, the third bias value as well as the third statistical variance can also result from the statistical combination of the first position estimate and the second position estimate.

According to some variants, the third position estimate does not necessarily have to be determined in order to determine the third bias value and the third statistical variance. For example, if the second position estimate provides an associated second bias value and a corresponding second statistical variance, it is conceivable that the third bias value and the third statistical variance are based on the first bias value, the first statistical variance, the second bias value, and the second statistical variance.

A further step is the evaluation of the first position estimate and the third position estimate on the basis of a quality criterion that takes into account the first or third bias values assigned to the respective position estimate and the first or third statistical variances assigned to the respective position estimate.

If the evaluation shows that the third position estimate is better than the first position estimate according to the quality criterion, in a further step the third position estimate is used as the result of the vehicle position estimation or as the basis for a combination with position information from one or more other sources.

If, on the other hand, the evaluation shows that the first position estimate is better than the third position estimate according to the quality criterion, the first position estimate is used as the result of the estimation of the vehicle position or as the basis for a combination with position information from one or more other sources (i.e. sources other than the second source). In particular, it may be envisaged that in this case the second position estimate (and thus also the third position estimate) will be discarded (i.e. ignored) for the purpose of estimating the vehicle position.

In the aforementioned cases, in which the first or third position estimate is used as the result of the estimation of the vehicle position, this result can, for example, be output to a downstream function module of the vehicle for further processing and, for example, can be used as the basis for controlling a driver assistance function of the vehicle.

According to one embodiment, the evaluation of the first position estimate and the third position estimate on the basis of a quality criterion includes a comparison of a first sum of the first bias value and the first statistical variance with a third sum of the third bias value and the third statistical variance.

According to a development of this embodiment, the first sum and the third sum may also be weighted sums, i.e. sums in which the respective bias and the respective statistical variance are weighted with different factors.

For example, according to a variant of this embodiment it can be determined that the third position estimate is better than the first position estimate according to the quality criterion if the third sum is less (in terms of value) than the first sum. Alternatively or additionally, it may also be provided that it is determined that the first position estimate is better than the third position estimate according to the quality criterion if the first sum is less than the third sum.

It is further within the scope of the invention that the evaluation of the first position estimate and the third position estimate on the basis of a quality criterion may include a comparison of the third bias value with the first statistical variance. Here, for example, it may be determined that the first position estimate is better than the third position estimate according to the quality criterion if the third bias value is greater than the first statistical variance.

The method according to the invention can be developed by determining the posture of the vehicle, i.e. estimating it in the manner proposed according to the invention. In addition to the position of the vehicle, a posture includes an orientation of the vehicle (for example, an orientation relative to one or more lane boundaries). For example, the position can be specified in Cartesian coordinates along an orthogonal system of two or three axes, and the orientation as an angle of rotation around these axes.

According to a second aspect of the invention, a processing device is proposed, wherein the processing device is designed to carry out a method in accordance with the first aspect of the invention. Features or advantages of the method can accordingly be transferred to the processing device or vice versa.

The processing device may, for example, be part of a control system of the vehicle, which includes one or more processors (such as CPUs and/or GPUs) on which the necessary computing operations to carry out the method take place.

For example, the vehicle whose position is to be estimated may have a processing device in accordance with the second aspect.

The vehicle preferably comprises a propulsion engine and is a motor vehicle, in particular a road-bound motor vehicle.

The motor vehicle can be controlled in the longitudinal direction, for example, by influencing the propulsion engine or a braking device.

The vehicle may be equipped with one or more driver assistance systems that make use of the estimated vehicle position. Preferably, the vehicle is set up for at least partially automated driving, up to highly automated or even autonomous driving.

For example, a driving function of the vehicle can be controlled depending on the estimated position. In particular, the driving function can provide longitudinal and/or lateral control of the vehicle, for example in the form of a speed assistant or a lane departure warning system. The estimated position can be a safety-relevant parameter of the vehicle and can be measured, for example, in the longitudinal and/or lateral direction of the vehicle.

A third aspect relates to a computer program comprising instructions which, when executed by a processing device, cause the computer program to execute a method according to the first aspect.

A fourth aspect of the invention relates to a non-transitory computer-readable (storage) medium comprising instructions which, when executed by a processing device, cause it to carry out a process according to the first aspect.

It is understood that the foregoing processing device referred to in connection with the third and the fourth aspects of the invention may be a processing device according to the second aspect of the invention.

For example, the processing device may include one or more programmable microcomputers or microcontrollers, and the method may be implemented in the form of a computer program product with program code means. The computer program product may also be stored on a computer-readable data carrier.

According to another aspect, a system for estimating a vehicle position is proposed. The system comprises a first source of position information and at least a second source of position information, wherein the sources may include, in particular, one or more environment sensors of the vehicle; and a processing device in accordance with the second aspect of the invention with a data technology connection to the sources, wherein the processing device is set up to receive the position information from the sources and to carry out a method according to the first aspect of the invention on the basis of the position information.

In accordance with some embodiments, position information derived from several different sources is combined to determine an estimated position of the vehicle. Here a decision is made as to whether a particular additional position information item provided by a source is used for the combination, depending on an expected bias value and an expected statistical variance of the combined position estimate (compared to a result without taking into account the further position information). The invention is based on the idea that a simultaneous optimization of the combined position estimate defined by a quality criterion can efficiently achieve an improved estimate of a vehicle position with regard to both the statistical variance and the bias value.

The invention is described below by means of exemplary embodiments with the aid of the attached drawings.

DETAILED DESCRIPTION OF THE DRAWINGS

Figure 1:
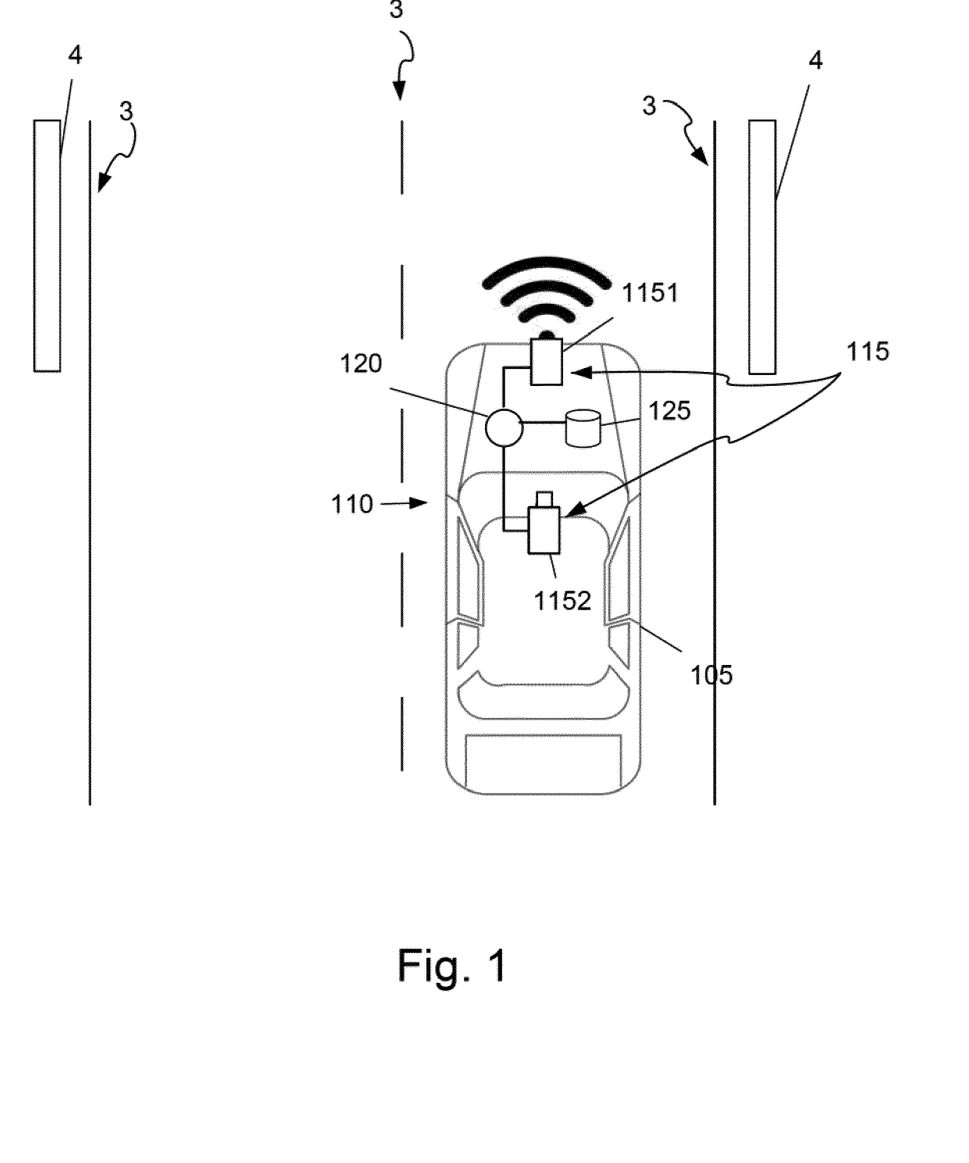
FIG. 1 shows by way of example and schematically a vehicle with a device for determining a position of the vehicle.

FIG. 1 schematically illustrates an example scene in which a position of a motor vehicle 105 travelling on the right of two lanes of a road is estimated using information from several different sources 115. The invention is explained below by way of example on the basis of this example scene, wherein reference is also made immediately to FIG. 2, which shows a schematic flowchart of a method 200.

The vehicle 105 is equipped with a system 110 for estimating a position of the vehicle 105. The device 110 includes several sources 115 for the provision of position information, wherein the sources are in particular a first sensor 1151 and a second sensor 1152. In this exemplary embodiment, the first sensor 1151 is a LiDAR sensor, and the second sensor 1152 is a camera.

In addition to the sources 115 expressly illustrated in FIG. 115, one or more other sources may also be provided, which together form a set of sources of information available for determining the position of the vehicle 105. For example, a receiver for receiving signals from a satellite-based navigation system (for example DGPS) and/or an odometer for providing odometry data can be provided as further sources of the totality of sources 115. Furthermore, for example one or more RADAR sensors can be provided as additional sources.

In the present exemplary embodiment, the system 110 further comprises a map memory 125 for providing map data which can be used in estimating the vehicle position. The estimation of the vehicle position can be made, for example, with reference to map data from the map memory 125.

The first sensor 1151 and the second sensor 1152 and, optionally, one or more other sources from the totality of sources 115 are equipped to collect and provide information regarding the environment of the vehicle 105. In the present exemplary embodiment, the camera 1152 and the LiDAR sensor 1151 are designed to capture or scan the environment of the vehicle 105. By means of the (optical) camera 1152, lane boundaries 3 painted on the roadway in particular can be detected. By means of the LiDAR sensor 1151, in particular objects or obstacles can be detected. Obstacles, for example in the form of crash barriers 4, can be detected.

Furthermore, the system 110 comprises a processing device 120 which has a data technology connection to the sources 115 and to the map memory 125.

The processing device 125 is set up in software to receive information from the sources 115 and, based on this, to estimate the position of the vehicle 105 (if appropriate with reference to map information from the map memory 125). For example, each source of the totality of sources 115 may be assigned a respective software component hereinafter referred to as a "matcher" at a logical or data processing level.

Each matcher (potentially) contributes to the position determination of the vehicle 105 by providing a position estimate based on position information from the respective source. Each matcher also specifies an associated statistical variance (such as a covariance or standard deviation) for the position estimate as well as an associated (expected) bias value. The bias value can be constant and can be specified, for example, in the form of a constant empirical value or a worst-case estimate for the respective source. Alternatively, the bias value can also vary over time, for example, depending on the quality of the position data currently provided by the respective source.

Another software component, also known as a "combiner", is set up to combine the position estimates provided by the matchers to create the estimated vehicle position. In each case, the combiner decides whether a position estimate provided by a matcher is used for the combination. This decision is made on the basis of an expected bias value and an expected statistical variance of the combined position estimate (compared to a result without taking into account the position estimate of the matcher in question). By simultaneously optimizing the combined position estimate with regard to both the statistical variance and the bias value, defined according to a quality criterion, an improved estimation of a vehicle position can be achieved in an efficient manner.

Figure 2:
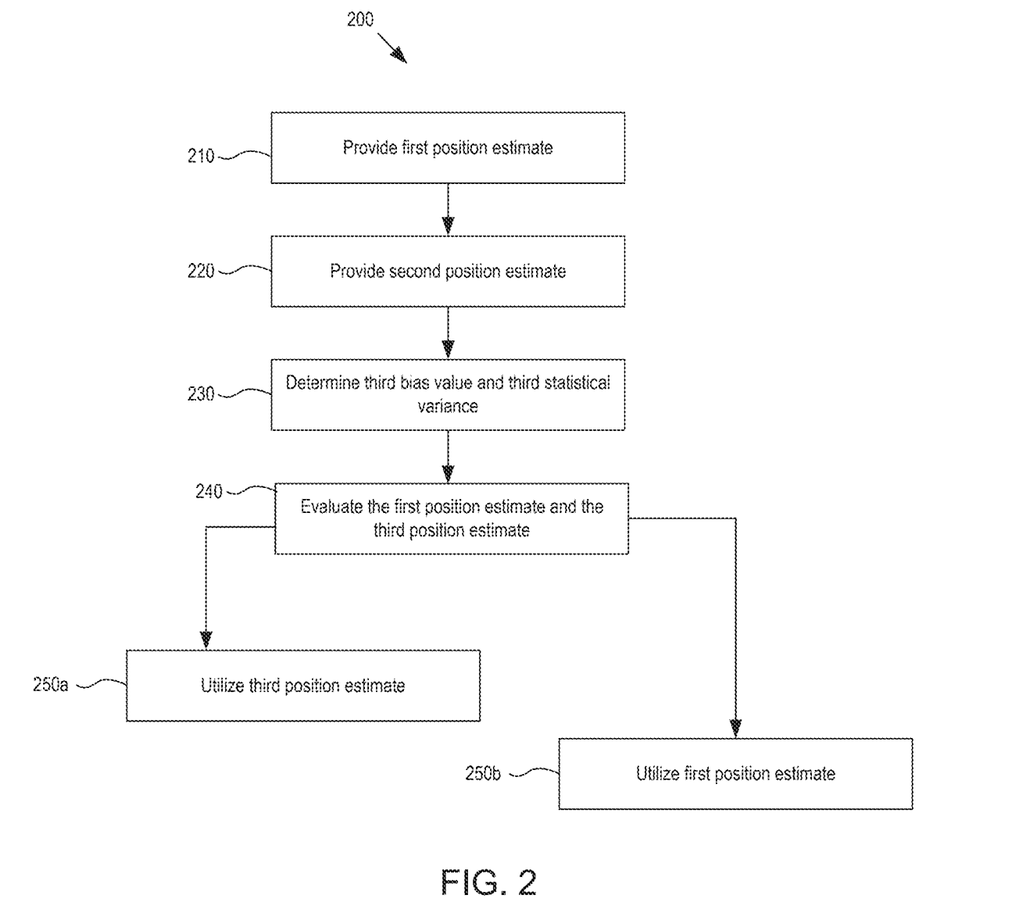
FIG. 2 shows a schematic flowchart of a method for determining a position of a vehicle.

Thus, in accordance with the foregoing embodiments, the processing device 120 is in particular set up to perform the following steps 210-250$a,b$, which are schematically illustrated in FIG. 2:

Providing 210 a first position estimate based on one or more position information items based on at least a first source, wherein an initial bias value and a first statistical variance are associated with the first position estimate;

Providing 220 a second position estimate based on one or more position information items from at least a second source;

Determining 230 a third bias value as well as a third statistical variance, wherein the third bias value and the third statistical variance are assigned to a third position estimate resulting from a combination of the first position estimate and the second position estimate;

Evaluating 240 the first position estimate and the third position estimate on the basis of a quality criterion, which takes into account the first or third bias value assigned to the respective position estimate and the first or third statistical variance assigned to the respective position estimate;

if the third position estimate is better than the first position estimate according to the quality criterion, using 250$a$ the third position estimate as the result of the estimation of the vehicle position or as a basis for a combination with positional information from one or more other sources; and if the first position estimate is better than the third position estimate according to the quality criterion, using 250$b$ the first position estimate as the result of the estimation of the vehicle position or as a basis for a combination with position information from one or more other sources.

For example, the evaluation 240 of the first position estimate and the third position estimation includes a comparison of a first sum of the first bias value and the first statistical variance with a third sum of the third bias value and the third statistical variance. For example, the combiner can determine that the third position estimate is better than the first position estimate according to the quality criterion if the third sum is less (in terms of value) than the first sum. Alternatively or additionally, it may also be determined that the first position estimate is better than the third position estimate according to the quality criterion if the first sum is less than the third sum.

In other words, the quality criterion used by the combiner to decide whether the second position estimate should be used for the combined position estimate may be whether this leads to a reduction (in terms of value) or to an increase in the sum of the bias value and the statistical deviation. In the event of an increase, the combiner ignores the second position estimate for the purpose of estimating the vehicle position and outputs the first position estimate as the result of the estimation of the vehicle position or uses it as a basis for a combination with position information from other sources (step 250*b* in FIG. 2). In the event of a reduction in size, the combiner outputs the third position estimate as the result of the vehicle position estimate or, if appropriate, uses it as a basis for combining it with position information from other sources, i.e. the second position estimate is taken into account when estimating the vehicle position (step 250*a* in FIG. 2).

In the example scene according to FIG. 1, the first position estimate can be provided, for example on the basis of lane boundaries 3 (optically) detected by the camera 1152. Experience has shown that such a camera-based lane detection system provides genuinely accurate and meaningful information for determining the location of the vehicle 105, i.e. the camera-based first position estimate can have a comparatively low bias value. There may be more or fewer "trustworthy" lane boundaries among the different lane boundaries 3. For example, a position estimate based on lane boundaries 3 of the current lane of the vehicle (i.e. the dashed marker 3 immediately to the left of the vehicle 105 and solid line 3 immediately to the right of the vehicle 105 in FIG. 1) generally lead to a comparatively low bias value. On the other hand, the consideration of a more distant lane, such as the leftmost lane boundary 3, entails a bias that often remains essentially constant over several control cycles of a driver assistance system of the vehicle 105.

In the example according to FIG. 1, for example, a camera-based matcher provides the first position estimate together with the first bias value, which corresponds to an expected bias due to imperfect determination of the positions of the lane boundaries 3. In addition, the camera-based matcher specifies an expected first statistical variance for the first position estimate, for example in the form of a first covariance. For example, an influence of a random movement of the vehicle 105, which can be described approximately by white noise, can be a significant contribution to the statistical variance of the first position estimate.

A second position estimate can be provided, for example, on the basis of obstacle detection by means of the LiDAR sensor 1151. Crash barriers 4 are indicated as exemplary obstacles to the right and left of the roadway in FIG. 1. Thus, a LiDAR-based matcher can output the second position estimate along with a second bias value and a second statistical variance. The second bias value can be comparatively large. For example, a lateral deviation of the second position estimate from the true vehicle position of a few centimeters, such as up to 30 cm, can be expected.

The availability of the second position estimate, which is based on the detection of crash barriers 4, can change along the route in a hardly predictable way, for example with the presence or absence (i.e. the beginning or end) of crash barriers 4. If the second position estimate is combined with the first position estimate to form a third position estimate, the third position estimate could suddenly jump laterally to the right, for example, with the beginning of the guard rails 4 at the upper end of the section of road illustrated in FIG. 1, so that an automated lateral guidance would abruptly steer the vehicle 105 to the left. As soon as the crash barriers 4 end again, a reverse movement to the right could result, and so on. As a result, the changing availability of the crash barrier-based second position estimation can in principle lead to sudden jumps in the estimate of the lateral position of the vehicle, which are for example translated by automated lateral guidance of the vehicle 105 into undesirable meandering driving that is not very comfortable for the vehicle occupants.

A solution to this problem could be to not even use position estimates with a comparatively large bias value, such as the LiDAR-based position estimate in the present case, for a combined (total) position estimate. This is because if a second position estimate with a large bias is combined with a first position estimate with a small bias, a third position estimate with a comparatively large bias results. This result is often worse than if only the first position estimate were to be used.

However, it can lead to an improved estimation of the vehicle position if a first position estimate, which has a large statistical variance and a small bias value, is combined with a second position estimate, which has a small statistical variance and a medium-sized bias value. For this reason, in the present embodiment, the combiner decides on the basis of the aforementioned quality criterion whether the second (LiDAR-based) position estimate provided to it should be used for a combination with the first (camera-based) position estimate or whether the first position estimate is better according to the quality criterion than the expected result of the combination (i.e. the third position estimate).

In a first numerical example, a variance of $(0.5 \text{ m})^2$ is assigned to the first position estimate. In this example, the first statistical variance is defined as the square root of the variance, i.e. as the (simple) standard deviation, and is accordingly 0.5 m. The first bias value is 0.1 m.

The second position measurement has a variance of $(0.1 \text{ m})^2$. Accordingly, the second statistical variance (defined here as a simple standard deviation) is 0.1 m. The second bias value is 0.2 m.

In this case, the combiner can, for example, find that a combination of the first position estimate and the second position estimate would result in a third position estimate which has an increased third bias value compared to the first position estimate, but at the same time also a significantly reduced third statistical variance, so that the sum of the bias value and the statistical variance is reduced by the combination.

Specifically, in this numerical example, a variance of the third position estimate can be calculated, for example, according to the known mathematical principles of the Kalman filter as follows:

$$1/((1/0.5 \text{ m})^2 + (1/0.1 \text{ m})^2) \approx (0.098 \text{ m})^2$$

The third statistical variance (defined as the simple standard deviation of the third position estimate) is therefore about 0.098 m.

The third bias value can be calculated according to the mathematical principles of the Kalman filter, for example as follows:

$$0.2 \text{ m} * (0.5 \text{ m})^2 / ((0.1 \text{ m})^2 + (0.5 \text{ m})^2) + 0.1 \text{ m} * (0.1 \text{ m})^2 / ((0.1 \text{ m})^2 + (0.5 \text{ m})^2) \approx 0.196 \text{ m}$$

The ("third") sum of the third statistical variance (defined as the simple standard deviation of the third position estimate) and the third bias value is slightly less than 0.3 m, i.e. smaller than the ("first") sum of the first standard deviation and the first bias value, which is m. The combiner therefore decides to output the third position estimate as the result of the vehicle position estimation or, if appropriate, to use it as a basis for a combination with one or more other (for example DGPS based) position estimates to estimate the vehicle position (step 250*a* in FIG. 2).

Depending on the use case, it is also possible that the evaluation 240 of the first position estimate and the third position estimate based on the quality criterion may include comparing the third bias value with the first statistical variance. For example, it is determined that the first position estimate is better than the third position estimate according to the quality criterion if the third bias value is greater than the first statistical variance.

In other words, the quality criterion used by the combiner to decide whether the second position estimate should be used for the combined position estimate may also take into account whether this results in a third bias value which is greater than the statistical variance of the first position estimate. If this is the case, the combiner ignores the second position estimate and outputs the first position estimate as the result of the vehicle position estimation or uses it as a basis for combining it with position information from other sources to estimate the vehicle position (step 250b in FIG. 2). If this is not the case, the combiner may output the third position estimate as the result of the estimation of the vehicle position or, if appropriate, may use it as a basis for combining it with position information from other sources (step 250a in FIG. 2).

This can be illustrated by a second numerical example. Here, the variance of a first position estimate is $(0.1\ \text{m})^2$. Accordingly, the first statistical variance given as a (simple) standard deviation is 0.1 m. An associated expected first bias value is 0.1 m. For example, the first position estimate can be purely camera-based or may already rely on a combination of camera-based and LiDAR-based position estimates.

A DGPS-based matcher also provides the combiner with a second position estimate with a variance of $(0.1\ \text{m})^2$ and an expected bias of 0.3 m. In other words, the second statistical variance is 0.1 m, and the second bias value is 0.3 m.

For example, in this second numerical example, the variance of the third position estimate is calculated as follows:

$$1/((1/0.1\ \text{m})^2+(1/0.1\ \text{m})^2)\approx(0.07\ \text{m})^2$$

The third statistical variance (defined as the simple standard deviation of the third position estimate) is therefore about 0.07 m.

For example, the worst-case bias of the third position estimate (i.e. the third bias value) can be calculated as follows:

$$0.1\ \text{m}*(0.1\ \text{m})^2/((0.1\ \text{m})^2+(0.1\ \text{m})^2)+0.3\ \text{m}*(0.1\ \text{m})^2/((0.1\ \text{m})^2+(0.1\ \text{m})^2)=0.2\ \text{m}$$

In this case, the ("third") sum of the third statistical variance (defined as the simple standard deviation of the third position estimate) and the third bias value, at about 0.27 m, is greater than the ("first") sum of the first standard deviation and the first bias value, which is 0.2 m. Thus, if the quality criterion is applied, according to which the first position estimate is better than the third position estimate according to the quality criterion, if the first sum is less than the third sum, the combiner would thus continue to work with the first position estimate and would not use the second position estimate for a combination.

In addition, the combiner could discard the DGPS-based second position estimation and continue to work with the first position estimate for the reason that the expected bias of the combined (third) position estimate (0.2 m) would be greater than the statistical variance of the first position estimate (0.1 m), so that the vehicle 105 is likely to be "pulled" in the wrong direction based on the combined position estimate.

It is for example possible that this (partial) quality criterion (concerning a comparison of the third bias value with the first statistical variance) could be combined with one or more other (partial) quality criteria, for example the quality criterion described above, concerning a sum of the bias value and the statistical variance, to form a more comprehensive quality criterion, so that the second position estimate is only used, for example, for a combination if, on the one hand, the sum of the bias value and the statistical variance is reduced as a result and, on the other hand, the resulting (third) bias value is not greater than the first statistical variance.

It should be noted that, especially in the case of the second numerical example above, the combiner may come to a different conclusion if, for example, three or four times the standard deviation of the respective (first/second/third) position estimate were used as the basis for the respective (first/second/third) statistical variance instead of the simple standard deviation, and then, on this basis, the sum of the first statistical variance and the first bias value was compared with the sum of the third statistical deviation and the third bias value. According to this quality criterion, the first position estimate and the third position estimate would be almost equally good on the basis of three times the standard deviation. Using four times the standard deviation, the third position estimate would be even better than the first position estimate. This makes it clear that in the second numerical example, the first position estimate is preferable if it is primarily a matter of driving comfort. If, on the other hand, a safety concept also takes into account rare exceptional cases, the combined (third) position estimate should be used.

In one embodiment variant, it is also possible to specifically prevent the bias from jumping between two values. For example, the vehicle can drive up to a certain point in time using DGPS, and then a LiDAR-based position estimation can suddenly be available. For example, both the LiDAR-based position estimate and the DGPS-based position estimate can each contribute a bias of 0.3 m. If the combiner decides to use the LiDAR information in addition to the DGPS-based information, this would reduce the overall error in the expected value of the combined position estimate. However, it could be that the DGPS-based position estimate has a bias of just 30 cm to the left at the time in question, while the LiDAR-based position estimate has a bias of 30 cm to the right. In such a case, the combiner can dispense with the use of LiDAR information to avoid a sudden lateral jump in the position estimate. However, new DGPS position information would be further merged, as it does not suddenly cause the bias to jump from left to right. Furthermore, for example, new position information based on the detection of lane boundaries and with a bias value of for example only 0.1 m would be taken into account in the sensor fusion, as it reduces the bias of the combined position estimate.

In accordance with the embodiment variant described above, it may therefore be provided that the combiner can store the information regarding the matcher from which a bias has been contributed and can decide, among other things, on this basis, which other matchers are subsequently suitable for a combined position estimation. Each time a position estimate with a lower bias (than the bias of the current position estimate) is combined, the overall bias is reduced. Each time a position estimate with a higher bias is added, the overall bias increases, and the combiner remembers the matcher whose position estimate led to the increase in bias. The matcher that last led to a bias increase may subsequently further increase the bias if this reduces the sum of the bias value and the statistical variance of the combined position estimate. Other matchers may only increase the bias if this significantly reduces the sum of the bias value and the statistical variance of the combined position estimate. This tactic of the combiner can prevent the combined position estimate from fluctuating back and forth in a curvilinear manner and leading to a "drunk" driving style (zigzagging).

The invention claimed is:

1. A computer-implemented method for estimating a vehicle position, the method comprising the steps of:
   providing a first position estimate based on one or more position information items from at least one first source, with an initial bias value and a first statistical variance associated with the first position estimate;
   providing a second position estimate based on one or more position information items from at least one second source;
   determining a third bias value as well as a third statistical variance, wherein the third bias value and the third statistical variance are assigned to a third position estimate resulting from a combination of the first position estimate and the second position estimate;
   evaluating the first position estimate and the third position estimate on the basis of a quality criterion which takes into account the first or third bias value assigned to the respective position estimate and the first or third statistical variance associated with the respective position estimate;
   when the third position estimate is better than the first position estimate according to the quality criterion, using the third position estimate as the result of the estimation of the vehicle position or as a basis for a combination with position information from one or more other sources; and
   when the first position estimate is better than the third position estimate according to the quality criterion, using the first position estimate as the result of the vehicle position estimation or as a basis for a combination with position information from one or more other sources.

2. The method according to claim 1, wherein the sources include at least one of:
   a sensor in the form of a LIDAR sensor, a RADAR sensor and/or a camera;
   an odometer; or
   a receiver module of a satellite navigation system.

3. The method according to claim 1, wherein the evaluation involves a comparison of a first sum of the first bias value and the first statistical variance with a third sum of the third bias value and the third statistical variance.

4. The method according to claim 3, further comprising:
   determining that the third position estimate is better than the first position estimate according to the quality criterion when the third sum is less than the first sum.

5. The method according to claim 3, further comprising:
   determining that the first position estimate is better than the third position estimate according to the quality criterion when the first sum is less than the third sum.

6. The method according to claim 1, wherein the evaluation involves a comparison of the third bias value with the first statistical variance.

7. The method according to claim 6, further comprising: determining that the first position estimate is better than the third position estimate according to the quality criterion when the third bias value is greater than the first statistical variance.

8. A device comprising one or more processors configured to:
   provide a first position estimate based on one or more position information items from at least one first source, with an initial bias value and a first statistical variance associated with the first position estimate;
   provide a second position estimate based on one or more position information items from at least one second source;
   determine a third bias value as well as a third statistical variance, wherein the third bias value and the third statistical variance are assigned to a third position estimate resulting from a combination of the first position estimate and the second position estimate;
   evaluate the first position estimate and the third position estimate on the basis of a quality criterion which takes into account the first or third bias value assigned to the respective position estimate and the first or third statistical variance associated with the respective position estimate;
   when the third position estimate is better than the first position estimate according to the quality criterion, use the third position estimate as the result of the estimation of the vehicle position or as a basis for a combination with position information from one or more other sources; and
   when the first position estimate is better than the third position estimate according to the quality criterion, use the first position estimate as the result of the vehicle position estimation or as a basis for a combination with position information from one or more other sources.

9. A computer product comprising a non-transitory computer-readable medium having stored thereon program code which, when executed by one or more processors, carry out the acts of:
   providing a first position estimate based on one or more position information items from at least one first source, with an initial bias value and a first statistical variance associated with the first position estimate;
   providing a second position estimate based on one or more position information items from at least one second source;
   determining a third bias value as well as a third statistical variance, wherein the third bias value and the third statistical variance are assigned to a third position estimate resulting from a combination of the first position estimate and the second position estimate;
   evaluating the first position estimate and the third position estimate on the basis of a quality criterion which takes into account the first or third bias value assigned to the respective position estimate and the first or third statistical variance associated with the respective position estimate;
   when the third position estimate is better than the first position estimate according to the quality criterion, using the third position estimate as the result of the estimation of the vehicle position or as a basis for a combination with position information from one or more other sources; and
   when the first position estimate is better than the third position estimate according to the quality criterion, using the first position estimate as the result of the vehicle position estimation or as a basis for a combination with position information from one or more other sources.

* * * * *